L. M. LANGE.
CHOCOLATE DIPPING MACHINE.
APPLICATION FILED MAY 9, 1911.
1,022,792.
Patented Apr. 9, 1912.
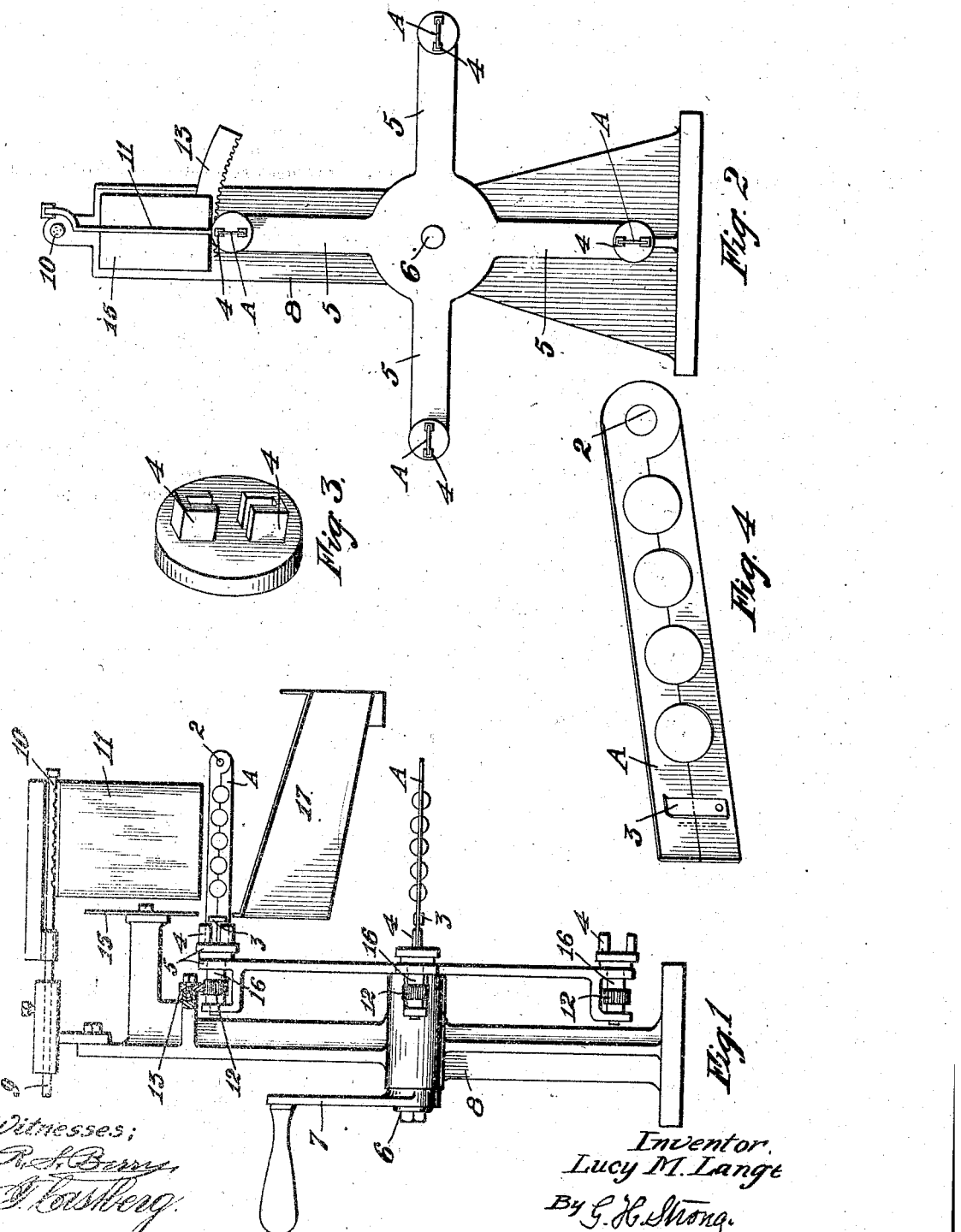
Witnesses:
R. S. Berry
T. Rushberg
Inventor.
Lucy M. Lange
By G. H. Strong.
Her Atty.

UNITED STATES PATENT OFFICE.

LUCY M. LANGE, OF OAKLAND, CALIFORNIA, ASSIGNOR OF ONE-HALF TO MAY EVA CLARKE, OF OAKLAND, CALIFORNIA.

CHOCOLATE-DIPPING MACHINE.

1,022,792.

Specification of Letters Patent.   Patented Apr. 9, 1912.

Application filed May 9, 1911. Serial No. 626,114.

*To all whom it may concern:*

Be it known that I, LUCY M. LANGE, citizen of the United States, residing at Oakland, in the county of Alameda and State of California, have invented new and useful Improvements in Chocolate-Dipping Machines, of which the following is a specification.

My invention relates to an apparatus which is designed for the preparation of confectionery, and particularly for the coating of candies with chocolate.

It consists in the combination of parts and details of construction which will be more fully explained by reference to the accompanying drawings, in which—

Figure 1 is a side elevation of the apparatus. Fig. 2 is a front view. Fig. 3 illustrates the means for clamping the holders. Fig. 4 is a view of one of the holders.

It is the object of my invention to provide a means for coating previously prepared candies with a film of chocolate; and to rapidly and evenly perform the operation.

As shown in the drawings, A represents a two-part clamp made of thin material, and hinged or pivoted, as at 2. This may be made any suitable length, so that when open it discloses spaces between the contiguous edges into which candies or confections of any desired shape may be placed, and when the two parts are closed together they may be held by a latch or device, as at 3, which serves to retain them in place. These clamps are then placed in holders 4 which are carried upon disks or radial arms 5, this portion being mounted upon a shaft or axle 6 which may be rotated by crank, as at 7, or by other suitable or desirable means, so that the holders or clamps A may be revolved around the axis in a position substantially parallel therewith.

The shaft 6 with its arms 5 is supported upon any suitably constructed standard, as at 8, and the upper part of this standard carries a supply device, 9, through which the melted chocolate may be delivered, passing through a perforated pipe 10, which is substantially in line above the axis of the machine. The perforations in this pipe deliver the liquid chocolate upon a glass or vertical plate 11 over which the liquid chocolate flows and from the lower edge of which it drips off. The lower edge of this plate 11 is located close to the point where each of the confection holding clips will pass at the upper portion of its revolution so that as each clip and the confections carried thereby passes beneath this plate the chocolate will drip upon the plate and the confections thus coating them as they pass.

In order to insure a more perfect coating of the confections I have made the clips so that they are held revoluble, as follows: The holders 4 are mounted upon a short axis; this axis being journaled in the arms 5 and carrying pinions 12. In the upper part of the stationary frame 8 is a short curved rack 13 so located that when the pinions 12 run near the top of the frame they will engage with this rack and will be rotated and with them the clips or carriers during the time while they are passing beneath the drip plate 11. By thus revolving the holders and clips, both sides of the confection which project from the sides of the clip will be equally exposed to the dripping material from the plate 11. They will thus be perfectly coated. The continued revolution of the apparatus carries these plates away and they are partially cooled during the revolution, so that they may be removed from the holders and other ones introduced. The clips may then be opened and the confections removed therefrom; each clip being subsequently cleansed in readiness to be again used.

In order to prevent any drip of the chocolate upon the gearing or other parts of the apparatus, I have shown a hood or covering, as at 15 which depends from the upper part of the apparatus sufficiently to protect the mechanism below. 16 is an inclined trough so located beneath the upper arc of travel of the carriers that any surplus drip which is not retained by the clips and confections will pass into this trough and may be discharged at the outer end into any suitable receptacle.

The apparatus provides a neat and accurate means for coating confections of various kinds in a symmetrical manner.

Having thus described my invention, what I claim and desire to secure by Letters Patent is—

1. A confectionery coating device consisting of a vertically revoluble disk or spider, holders projecting from the face thereof, hinged clips adapted to contain confections and to be removably secured by the holders, and a drip plate over which the material to be deposited is caused to pass, said drip plate being suspended above the arc of travel of the confection carriers.

2. In an apparatus for coating confectionery, a horizontally revoluble shaft, a spider or disk having holders revolubly carried at the outer periphery, hinged clips adapted to contain the confections to be coated, said clips being removably attachable to the holders to project therefrom, a means for supplying a liquid coating material, a perforated pipe through which coating material passes, a dependent drip plate over which it flows, said plate having its lower edge located above the line of travel of the confection carriers, and means for revolving said carriers while passing beneath the drip plate.

3. The combination in a confection coating apparatus of a horizontally revoluble shaft and a spider or disk carried thereby, revoluble shafts journaled in the outer ends of the spider and holders carried thereby, hinged foldable clips adapted to contain confections to be coated, said clips being removably attachable to the holders to project therefrom, a means for supplying a liquid coating material, a perforated pipe through which the material may escape, a drip plate suspended beneath said pipe, with its lower edge contiguous to the upper arc of travel of the carriers, a fixed segmental arc contiguous to the said upper arc of travel, and pinions fixed to the shafts of the revoluble holders, said pinions engaging the segment to revolve the confection carriers during their passage beneath the drip plate.

4. The combination in a confection coating apparatus of a horizontally revoluble shaft and a spider or disk carried thereby, revoluble shafts journaled in the outer ends of the spider and holders carried thereby, hinged foldable clips adapted to contain confections to be coated, said clips being removably attachable to the holders to project therefrom, a means for supplying a liquid material, a perforated pipe through which said material may escape, a drip plate suspended beneath said pipe, with its lower edge contiguous to the upper arc of travel of the carriers, a fixed segmental arc contiguous to the said upper arc of travel, pinions fixed to the shafts of the revoluble holders, said pinions engaging the segment to revolve the confection carriers during their passage beneath the drip plate, and a conductor to convey away the surplus drip.

5. The combination in a confection coating apparatus of a horizontally revoluble shaft and a spider or disk carried thereby, revoluble shafts journaled in the outer ends of the spider and holders carried thereby, hinged foldable clips adapted to contain confections to be coated, said clips being removably attachable to the holders to project therefrom, a means for supplying a liquid material, a perforated pipe through which said material may escape, a drip plate suspended beneath said pipe, with its lower edge contiguous to the upper arc of travel of the carriers, a fixed segmental arc contiguous to the said upper arc of travel, pinions fixed to the shafts of the revoluble holders, said pinions engaging the segment to revolve the confection carriers during their passage beneath the drip plate, a conductor to convey away the surplus drip, and a hood located beneath the source of supply to protect the gears and mechanism from the drip.

In testimony whereof I have hereunto set my hand in the presence of two subscribing witnesses.

LUCY M. LANGE.

Witnesses:
J. B. GORDON,
H. L. BRANTHAVER